May 25, 1937.  S. J. KRIVIG  2,081,544
DEVICE FOR MEASURING AND DISPENSING FLOWING MATERIALS
Filed Aug. 3, 1936  4 Sheets-Sheet 1
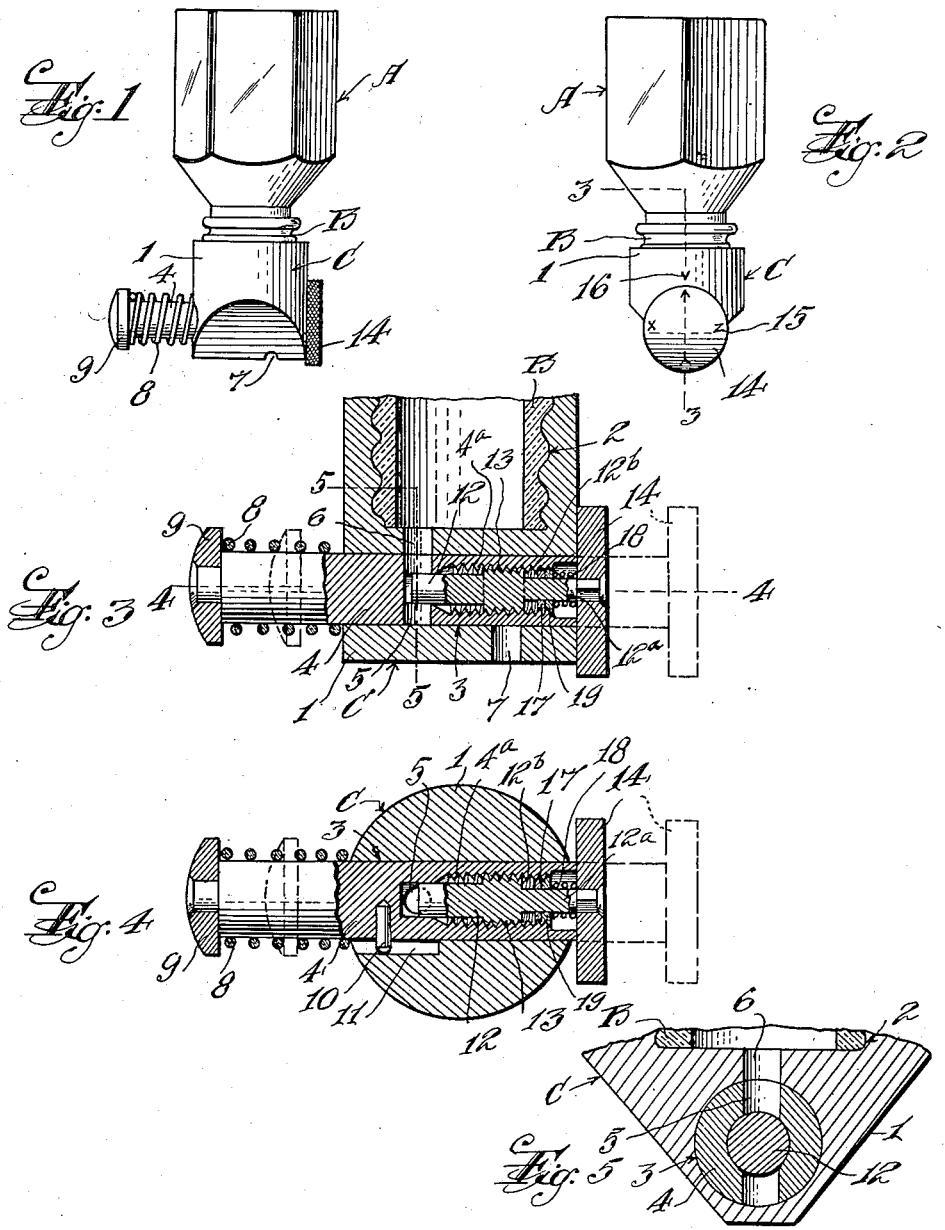
INVENTOR
Stephen J. Krivig
BY
Harry D. Rock
ATTORNEY May 25, 1937. S. J. KRIVIG 2,081,544
DEVICE FOR MEASURING AND DISPENSING FLOWING MATERIALS
Filed Aug. 3, 1936 4 Sheets-Sheet 2

INVENTOR
Stephen J. Krivig
BY Harry S. Rook
ATTORNEY

May 25, 1937. S. J. KRIVIG 2,081,544
DEVICE FOR MEASURING AND DISPENSING FLOWING MATERIALS
Filed Aug. 3, 1936 4 Sheets-Sheet 3
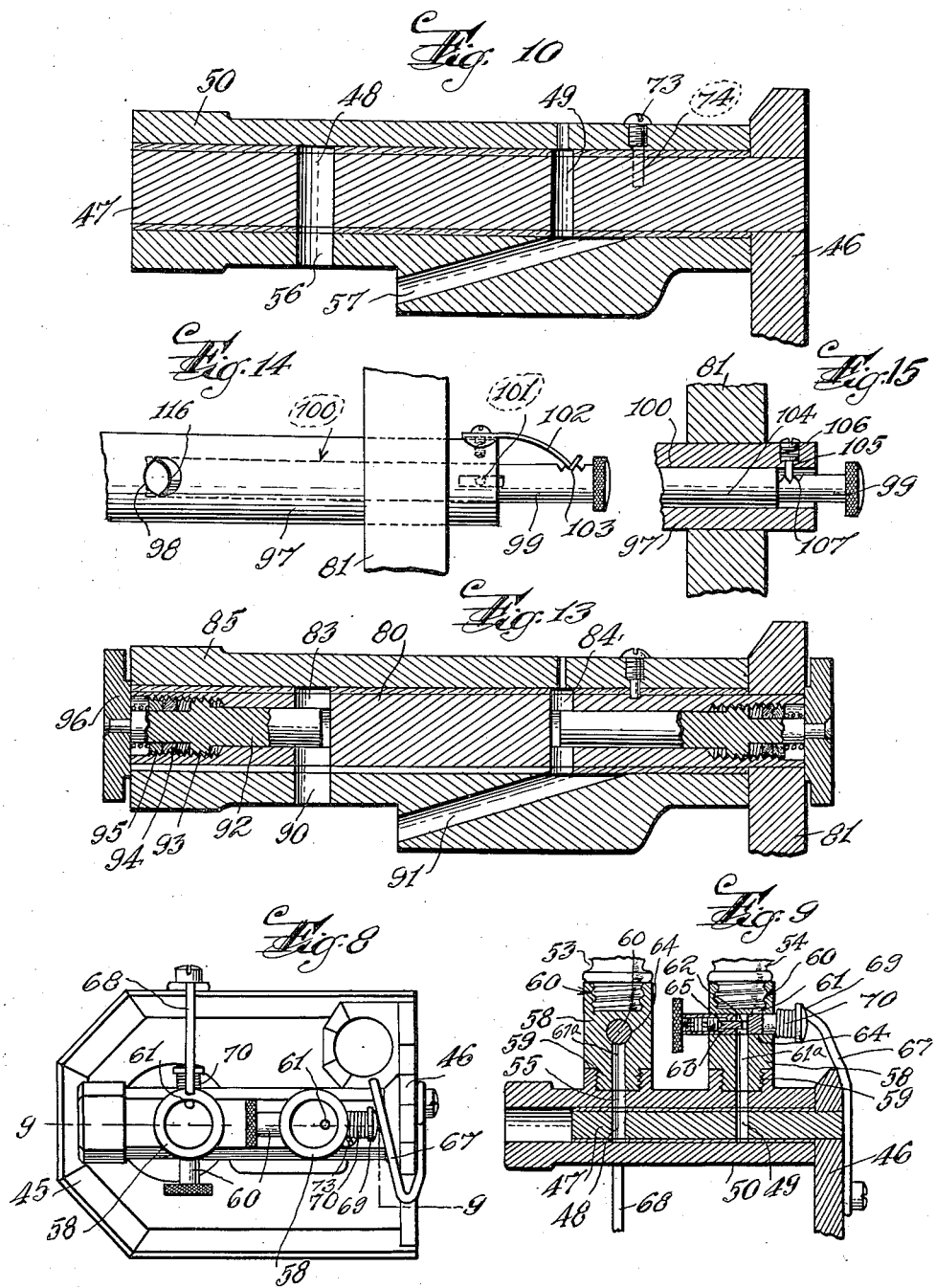
INVENTOR
Stephen J. Krivig
BY Harry B. Rork
ATTORNEY May 25, 1937.    S. J. KRIVIG    2,081,544
DEVICE FOR MEASURING AND DISPENSING FLOWING MATERIALS
Filed Aug. 3, 1936    4 Sheets-Sheet 4

INVENTOR
Stephen J. Krivig
BY
Harry Brook
ATTORNEY

Patented May 25, 1937

2,081,544

UNITED STATES PATENT OFFICE 2,081,544

DEVICE FOR MEASURING AND DISPENSING FLOWING MATERIALS

Stephen J. Krivig, Irvington, N. J., assignor to Baker & Company, Inc., Newark, N. J., a corporation of New Jersey Application August 3, 1936, Serial No. 93,933

10 Claims. (Cl. 221—104)

This application is a continuation in part of my copending application Serial No. 41,674, filed September 23, 1935; and this invention relates in general to devices for measuring flowing materials, for example, powdered, granular or liquid substances, and more particularly the invention contemplates the measuring of granular alloy or metal and mercury which are used in making tooth fillings, whereby accurately measured quantities of the materials in the proper proportions for mixing can be easily and quickly obtained. Especially the invention concerns such devices of the so-called predetermined bulk type.

It is highly desirable, if not necessary, especially in the case of materials for making dental fillings, that the proportions of the materials be changed from time to time; for example, at one time a dentist may desire a dry mixture of alloy and mercury, that is one having a relatively small quantity of mercury, while at another time a wet mixture may be wanted.

Therefore, a prime object of my invention is to provide a measuring device of the general character described which shall include novel and improved means whereby the device may be easily and quickly adjusted to deliver or dispense accurately measured quantities of materials of different weight or volume at different times as desired by the user.

Another object of the invention is to provide a variable measuring device of the character described which can be used in connection with or embodied in many different types of predetermined bulk measuring or dispensing mechanisms, for example in such mechanisms including a casing having a trap or measuring member mounted therein which has a trap or measuring chamber to alternately register with each of two openings in the casing upon relative sliding or rotation of the trap member and casing, one of the openings in the casing communicating with the supply of material to be measured and the other opening serving to discharge the material.

Certain known mechanisms of this general character include parts adjustably projecting into the trap chamber to vary the capacity of the latter, but the structures are such that particles of powdered material or globules of liquid may become caught or accumulate in angular corners at the juncture of the adjustable part with the walls of the trap chamber or in crevices in or between the parts of the device, and are not always discharged during the dispensing operation, and the accuracy of measurement is thereby destroyed. Another object of my invention is to provide a variable measuring device of the general character described which shall overcome these difficulties and ensure consistently accurate measurement.

In one known type of predetermined bulk measuring device, a stationary cylindrical trap or measuring stem has a transverse measuring or trap chamber therethrough and a tubular casing rotatable thereon which has two openings one communicating with a container for the material and the other serving as a discharge opening, said openings being brought alternately into register with the measuring or trap chamber upon rotation of the casing. In this known type of device, the amount of material which may be measured is fixed, and one object of my invention is to provide a novel and improved adaptor for use in connection with such a device whereby the amount of material measured may be varied at different times as desired by the user.

Further objects of the invention are to provide a novel and improved means for varying the volume or capacity of the trap or measuring chamber so that said chamber may be adapted for measuring different quantities of material at different times; to provide such means whereby the user of the device can accurately manually set it whenever desirable to measure any one of a plurality of different quantities of material; and to provide means for indicating the quantity which will be measured at any given setting of said means.

Other objects, advantages and results of the invention will appear to those skilled in the art from the following description when read in connection with the accompanying drawings.

For the purpose of illustrating the principles of the invention I have shown it specifically in connection with the devices for measuring powdered or granular alloy and mercury for use in making dental amalgam fillings, but the invention may be used in connection with measuring of any other materials which are capable of flowing, and for many other uses than the making of dental amalgams.

In said drawings, Figure 1 is a front elevation of the measuring device embodying my invention.

Figure 2 is a side elevation thereof.

Figure 3 is a vertical longitudinal sectional view on a greatly enlarged scale taken on the line 3—3 of Figure 2.

Figure 4 is a horizontal sectional view on the line 4—4 of Figure 3.

Figure 5 is a further enlarged vertical sectional view on the line 5—5 of Figure 3.

Figure 8 is a top plan view of the device showing the parts in position to discharge material from the containers to the rotatable casing but with the containers removed for clearness in illustration.

Figure 9 is a vertical sectional view on the line 9—9 of Figure 8.

Figure 10 is a vertical sectional view on a greatly enlarged scale taken on the line 10—10 of Figure 7.

Figure 13 is an enlarged vertical longitudinal sectional view on the line 13—13 of Figure 12.

Figure 14 is a fragmentary plan view of a modified form of the measuring stem of the general nature shown in Figure 13, and Figure 15 is a fragmentary vertical longitudinal sectional view through another modification of the measuring stem.

Figure 6:
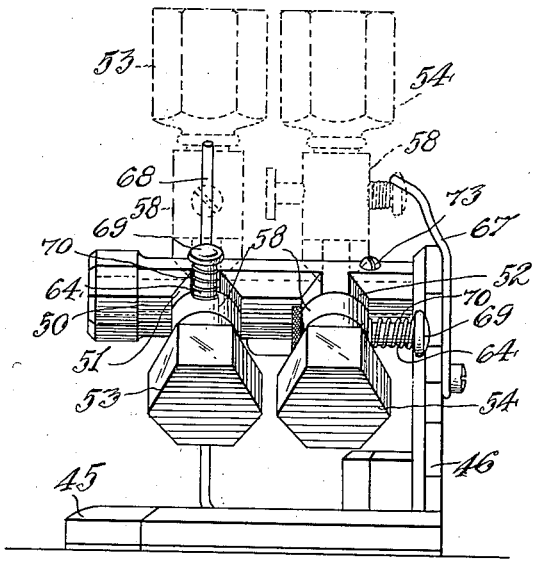
Figure 6 is a front elevation of a measuring device including my adaptor for varying the amount of material measured by the device.

Specifically describing the embodiment of the invention illustrated in Figures 1 to 5 inclusive, the reference character A designates a container for material to be measured, for example, a glass bottle which has a threaded neck B to which is separably attached my measuring device C. This measuring device includes a body or casing 1 having a screw threaded socket 2 to fit the neck B of the container, and a transverse cylindrical passage 3 the axis of which is approximately perpendicular to the axis of the socket 2 and in approximately the same plane therewith. Within the passage 3 is slidably mounted a cylindrical measuring or trap rod or member 4 which has a cylindrical trap or measuring chamber 5 extending transversely therethrough to communicate alternately with a port 6 leading from the socket 2 and a port 7 for discharging the material. These ports are offset longitudinally of the passage 3, and the trap rod 4 is normally held in position to bring the trap chamber 5 into register with the supply port 6 by means of a compression spring 8 interposed between the casing 1 and a thumb piece 9 on the end of the trap rod. For limiting movement of the trap rod in one direction, the rod may have a stud 10 slidable in a groove 11 in the casing to engage a shoulder at the end of the groove, while the engagement of the finger piece 14 with the casing limits movement in the other direction. In operation of the device for measuring material, the container will be inverted as shown in Figure 1 so that the material will flow from the container through the supply port 6 into the trap chamber 5 and then the finger piece 9 will be pressed by the operator to slide the trap rod so as to close the port 6 and bring the trap chamber 5 into register with the discharge port 7 from which the material will be discharged by gravity.

The trap rod will then be released whereupon the spring 8 will again bring the trap chamber into register with the supply opening 6 for the next charge.

The trap chamber 5 has a predetermined capacity so that certain amounts of material will be discharged upon each operation of the trap rod. It is a feature of my invention that different amounts of material shall be measured at different times as desired by the user, and accordingly I have shown means for varying the capacity of the trap chamber 5 which is illustrated as consisting of a capacity adjuster which is in the form of a screw rod 12 threaded at 13 coaxially within the trap rod with one end cylindrical and projecting into the trap chamber transversely thereof. The other end of the screw rod has fixed thereon a thumb piece 14 whereby the capacity adjuster may be rotated. By rotating the capacity adjuster through the thumb piece 14 to vary the distance which the end of the capacity adjuster projects through the trap chamber, the capacity of the trap chamber can be varied, and preferably the thumb piece has indicia 15 to cooperate with a fixed indicia 16 on the casing to indicate the amount of material which will be measured by the trap chamber with any given setting of the capacity adjuster. For limiting movement of the capacity adjuster from the trap rod I have shown a stop ring 17 and for holding the capacity adjuster in set positions, I may interpose a spring 18 between the thumb piece 14 and a lock ring 19 which locks the nut 17 against movement. Rotation of the trap rod during adjustment of the capacity adjuster is prevented by the stud 10 in the slot 11. The measuring member 4 has a screw threaded recess 4ª in which the screw rod 12 is screw threaded, and the screw rod has a reduced portion 12ª forming a shoulder 12ᵇ at its outer end, the reduced portion B being surrounded by the stop ring 17 and lock ring 19.

The capacity adjuster rod 12 is of a diameter and cross-sectional area less than that of the measuring element 4 and at least as great as and preferably greater than the diameter and cross-sectional area respectively of the corresponding trap passage or chamber and the axis of the respective capacity adjuster rod and trap passage or chamber will lie in the same plane, for example as shown in Figures 3, 4 and 5, so as to reduce the possibility of the mercury, amalgam alloy or other material, accumulating in angles, corners, crevices or spaces between the capacity adjuster rods and the walls of the trap passage or chamber. Obviously, should the diameter of the capacity adjuster rod be made less than that of the trap passage or chamber, there would be a small space between the capacity adjuster rod and the walls of the trap passage or chamber in which materials might accumulate and become stuck, so that different quantities of materials might be dispensed at different times with the same setting of the capacity adjuster rod, which would result in undesirable inaccuracies or lack of uniformity in measuring of the quantities of materials dispensed. Also the end of the capacity adjuster rod 12 which projects into the measuring chamber is smooth and free from crevices or recesses so as to ensure against accumulation of material on the surface of the rod.

In Figures 6 to 10 inclusive I have shown my invention in connection with a known type of predetermined bulk measuring device for adapting said device to measuring different quantities of materials at different times. As illustrated, the device is specifically adapted for measuring quantities of powdered alloy and mercury for use in making dental amalgam fillings and includes a base 45 having a vertical flange or standard 46 at one end in which is fixedly mounted a horizontal main measuring stem 47 in the form of a cylindrical rod and having two transverse vertically disposed trap passages 48 and 49 for the alloy and mercury respectively. Rotatably mounted upon the stem 47 is a casing 50 which has interiorly screw threaded bosses 51 and 52 spaced longitudinally thereof for connection to containers 53 and 54 for alloy and mercury respectively. The casing 50 has supply ports 55 to establish communication between the containers 53 and 54 and the respective trap passages 48 and 49, other ports 56 and 57 being provided in the casing to communicate with the respective trap passages 48 and 49 for discharging the material being measured.

The portions of the device so far described, shown in Figures 6 to 9 inclusive, are known in the art and can be used for measuring only predetermined invariable quantities of material. In accordance with the invention I provide an adaptor for use with such an invariable measuring device to permit measuring of different or variable quantities at different times. As shown, I use an adaptor between at least one trap passage 48 or 49 and the respective container 53 or 54.

The adapter includes a casing 58 having an exteriorly screw threaded boss 59 fitted in the socket 51 or 52 of the casing 50, the other end of the casing 58 having an internal threaded socket 60 to receive the threaded neck of one container 53 or 54. A longitudinal passage having a receiving end 61 to communicate with the container and a discharge end 61a to communicate with the supply port 55, is provided in the casing 58 to cooperate with a measuring or trap chamber 62 in a trap rod 63 in substantially the same manner as shown in Figure 3. The trap rod is slidably mounted in a transverse passage 64 in the adapter casing intersecting the passage 61, 61a and has a capacity adjuster 65 substantially identical in construction with the capacity adjuster 12 of Figure 3 for varying the capacity of the trap chamber 62.

Figure 7:
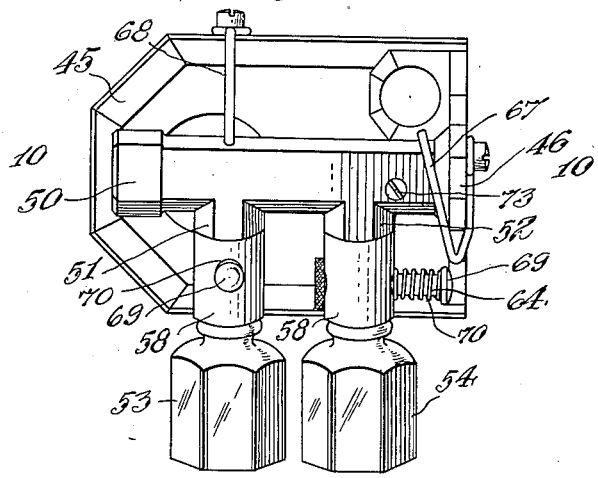
Figure 7 is a top plan view thereof showing the containers in normal position.

In operation of the device, the casing 50 is normally located with respect to the trap passages 48 and 49 so as to permit discharge of materials from the discharge openings 56 and 57, and the containers and adapters project substantially horizontally at one side of the casing and stem 47 so that the weight of the containers holds the casing in said position, as shown in Figures 6 and 7. Upon rotation of the casing 50 to swing the containers upwardly into approximately vertical position as shown in Figure 9, the trap passages 48 and 49 are registered with the passages 61a through the adapter casings while the outlet passages 56 and 57 of the main casing 50 are closed.

When the casing 50 and containers 53 and 54 are in normal horizontal position the measuring chamber of the measuring element registers with the passages 61 leading from the containers, and as the containers are swung upwardly, action of gravity causes the material in the containers to flow into the measuring chambers. In accordance with the invention as the containers reach their uppermost vertical position, the measuring elements or trap rods are slid in the respective passages 64 to bring the measuring chambers 62 into register with the passages 61a as shown in Figure 9, so that the material in the measuring chambers is discharged into the respective trap passages 48 and 49; and when the casing 50 is rotated to return the containers to their normal position the trap rods are slid in the opposite direction by the respective springs 70 to receive the next charges of material from the containers, and the discharge passages 56 and 57 are brought into register with the trap passages 48 and 49 to discharge the materials.

For operating the trap rods 63 I have shown rigid cam arms 67 and 68 mounted on the base 45 to be slidably engaged by the respective thumb pieces 69 on the trap rods as clearly shown in Figures 8 and 9. As shown, in these figures, the two trap rods are arranged with their axes in planes perpendicular to each other, and the respective cam rods 67 and 68 are correspondingly shaped and located on the base 45.

To limit rotation of the casing 50 a set screw 73 is provided in the casing to abut the ends of an arcuate slot 74 in the main stem 47 at the two limits of movement of the casing.

Figure 11:
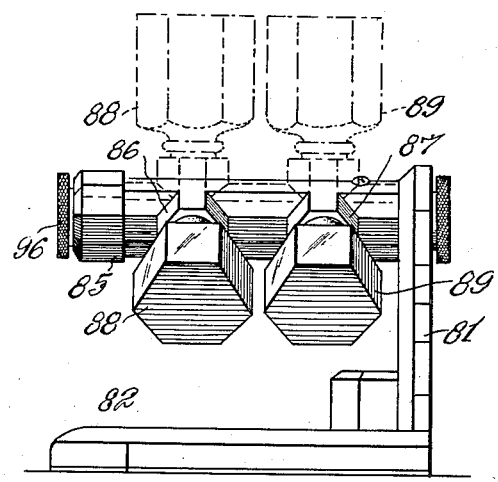
Figure 11 is a view similar to Figure 6 showing another form of the invention.
Figure 12:
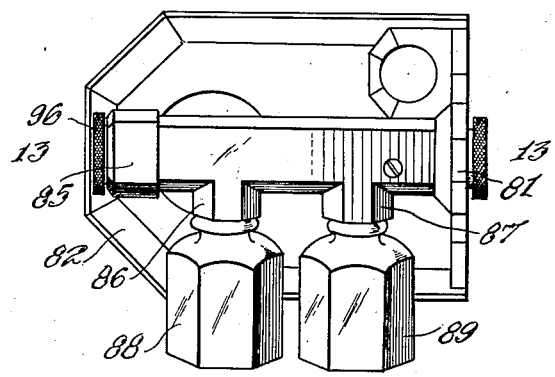
Figure 12 is a view similar to Figure 7 of the form shown in Figure 11.

In Figures 11 to 13 inclusive I have shown another form of the invention in general similar to that shown in Figures 6 to 10, the main difference between the two constructions being that the adapter devices 58 of the construction shown in Figures 6 to 10 are omitted, and capacity adjusters are embodied directly in the main measuring stem. The measuring stem 80 corresponding to the measuring stem 47 is mounted in a standard 81 on a base 82 and has two trap chambers 83 and 84. A casing 85 is rotatable on the measuring stem 80 and has bosses 86 and 87 to which are connected the containers 88 and 89 for the materials to be measured. The casing also has passages corresponding to the passages 55 for establishing communication between the respective containers and the trap passages 83 and 84, discharge passages 90 and 91 being also provided in the casing for discharging materials from the trap passages. The operation of the casing 85 for measuring the materials is the same as the operation of the casing 50 and need not be described in detail.

In accordance with the invention a capacity adjuster is provided for each trap passage 83 and 84 each capacity adjuster comprising a screw 92 threaded at 93 in a coaxial opening in one end of the measuring stem 80 and projecting into the corresponding trap passage. Stop and jam nuts 94 and 95 corresponding to the nuts 17 and 19 are provided for limiting movement of the capacity adjuster rods 92, and each adjuster rod has a finger piece 96 for rotating.

Instead of rotating the capacity adjusters as shown in Figures 11 to 13 inclusive I may provide slidable capacity adjusters as shown in Figures 14 and 15. Referring particularly to Figure 14 the reference character 97 designates the measuring stem corresponding to the stem 80 and 98 designates a trap passage. The capacity adjuster is in the form of a cylindrical rod 99 longitudinally slidable coaxially in an opening 100 in one end of the stem 97 so that one end of the rod projects into the trap passage 98 for varying the capacity thereof. Rotation of the capacity adjuster rod is prevented by a pin and slot connection 101 between the rod and the measuring stem, while the capacity adjuster may be held in its adjusted position by a spring detent 102 fixedly connected to one end of the measuring stem to engage notches 103 in the rod 99.

In Figure 15 I have shown another form of detent for the capacity adjustor rod 104, said detent consisting of a pawl 105 normally influenced by a spring 106 into engagement with notches 107 in the rod 104.

It will be understood by those skilled in the art that the trap passages or chambers may be of any suitable configuration. Also the ends of the capacity adjuster rods which project into the trap chambers may be flat as shown in Figure 3, or concave as shown at 116 in Figure 14. Also the capacity adjusters may be capable of closing the trap passages completely as shown in Figures 3 and 4, or may partially transversely close the trap passages as shown in Figure 14.

Furthermore it should be understood that in structures of the nature shown in Figures 6–13 inclusive, one or more than two containers may be utilized, and the capacity adjuster may be associated with only one or all of the containers, as desired.

Other modifications and changes in the details of construction and mode of operation of the invention will occur to those skilled in the art as within the scope of the invention.

Having thus described my invention, what I claim is:

1. In a measuring device of the character described, the combination of a casing having a supply opening to receive material and a discharge opening, a measuring element in said casing having a transverse cylindrical passage forming a measuring chamber having a diameter substantially less than that of said measuring element to register alternately with said supply and discharge openings upon relative movement of said casing and measuring element in opposite directions, and a movable member in said measuring element having a cylindrical portion projecting into said measuring chamber transversely thereof to vary the capacity of said chamber, said movable member having its axis in a common plane with the axis of said measuring chamber and said cylindrical portion having a cross-sectional area at least as great as that of said chamber.

2. In a measuring device of the character described the combination of a casing having a supply opening to receive material and a discharge opening, a measuring element in said casing having a measuring chamber to register alternately with said supply and discharge openings upon relative movement of said casing and measuring element in opposite directions, said measuring element having a screw threaded recess, a movable member coaxial with said recess and projecting into said measuring chamber to vary the capacity thereof, said member having a portion screw threaded into said recess and a reduced portion at its outer end forming a shoulder, and a ring screw threaded into said recess, surrounding said reduced portion and cooperating with said shoulder to limit movement of said movable member outwardly of said recess.

3. In a measuring device of the character described the combination of a casing having a supply opening to receive material and a discharge opening, a measuring element in said casing having a cylindrical measuring chamber extending transversely thereof to register alternately with said supply and discharge openings upon relative movement of the casing and measuring element in oppposite directions, said measuring element having a coaxial recess intersecting said measuring chamber with a portion screw threaded, a movable member in said recess having its axis in a common plane with the axis of said measuring chamber and having a smooth cylindrical portion of a diameter greater than the measuring chamber projecting into said measuring chamber to vary the capacity thereof, said member having another portion screw threaded into said recess and projecting from one end of the measuring element, and a thumb piece on said projecting end for rotating said member.

4. In a measuring device of the character described, the combination of a casing having a supply opening to receive material and a discharge opening and a cylindrical opening intersecting both of said supply and discharge openings, a cylindrical measuring stem in said cylindrical opening whereby said casing and stem may relatively rotate, said stem having a trap passage to register with said supply and discharge openings upon rotation of the casing on said stem in opposite directions respectively, and a variable measuring device connected to said casing between said supply opening and the supply of material including a body having a passage for material from a material supply to said supply opening, a measuring element having a measuring chamber to receive and discharge material through said passage, and means for operating said variable measuring device to successively receive material from said material supply and discharge it into said supply opening as said casing is rotated on said measuring stem to register said supply opening with said trap passage, and means for varying the capacity of said measuring chamber.

5. The combination with a measuring device for dispensing predetermined invariable quantities of flowing materials and including two relatively movable parts one having supply and discharge openings and the other having a trap-passage to register successively with said supply and discharge openings upon relative movement of said parts, of a variable measuring device including a casing having a discharge opening connected to said supply opening and a receiving opening to be connected to a material supply, a measuring element movable in said casing and having a measuring chamber to register with said receiving opening and said discharge opening upon movement of the element in opposite directions respectively, means for operating said variable measuring device to successively receive material from said material supply and discharge it into said supply opening as said two relatively movable parts of the invariable measuring device are operated to register said supply opening with said trap passage, and a capacity adjuster for varying the capacity of said measuring chamber.

6. In a measuring device of the character described, the combination of a casing having a supply opening to receive material and a discharge opening and a cylindrical opening intersecting both of said supply and discharge openings, a cylindrical measuring stem in said cylindrical opening whereby said casing and stem may relatively rotate, said stem having a trap passage to register with said supply and discharge openings upon rotation of the casing on said stem in opposite directions respectively, and a variable measuring device including a body connected at one end to said casing, a container for material connected to the other end of said body, said body having receiving and discharge openings communicating respectively with said container and said supply opening of the casing, a measuring element slidable in said casing and having a measuring chamber to register with said receiving and discharge openings alternately upon sliding of the element in opposite directions, means for sliding said measuring element to cause said measuring chamber to successively receive material from said container and discharge it into said supply opening of said casing as the casing is rotated on said measuring stem to register said supply opening with said trap passage.

7. A measuring device comprising a stationary cylindrical measuring stem having a transverse vertical trap passage therein, a casing rotatable on said stem and having a supply opening and a discharge opening to register alternately with the upper and lower ends respectively of said trap passage upon rotation of said casing in opposite directions, and a capacity adjuster comprising a movable member coaxially mounted in said measuring stem and projecting into said trap passage for varying the capacity of said trap passage.

8. A measuring device comprising a stationary cylindrical measuring stem having a transverse vertical trap passage therein, a casing rotatable on said stem and having a supply opening and a discharge opening to register alternately with the upper and lower ends respectively of said trap passage upon rotation of said casing in opposite directions, a variable measuring device including a body separably connected at one end to said casing, a container for material mounted at the other end of said body, said body having a passage for material from said container to said supply opening, a measuring element in said body having a measuring chamber to receive and discharge material through said passage, and means for operating said measuring element to receive material from said container through said passage and discharge it into said supply opening as said casing is rotated on said measuring stem to register said supply opening with said trap passage, and a capacity adjuster for varying the capacity of said measuring chamber.

9. In a measuring device of the character described the combination of a casing having a supply opening to receive material and a discharge opening, a measuring element in said casing having a measuring chamber to register alternately with said supply and discharge openings upon relative movement of said casing and measuring element in opposite directions, said measuring element having a screw threaded recess, a movable member coaxial with said recess and projecting into said measuring chamber to vary the capacity thereof, said member having a portion screw threaded into said recess and a reduced portion at its outer end forming a shoulder, and a ring screw threaded into said recess, surrounding said reduced portion and cooperating with said shoulder to limit movement of said movable member outwardly of said recess, a thumb piece on the outer end of said member, and spring friction means interposed between said thumb piece and said ring to frictionally resist rotation of said member and hold it in adjusted positions.

10. In a measuring device of the character described the combination of a casing with a transverse opening and having a supply opening to receive material and a discharge opening both intersecting said transverse opening at opposite sides thereof, a measuring element in said transverse opening having a cylindrical measuring chamber extending transversely therethrough to register alternately with said supply and discharge openings upon relative movement of the casing and measuring element in opposite directions, said measuring element having a coaxial recess intersecting said measuring chamber with a portion screw threaded, a movable member in said recess having its axis in a common plane with the axis of said measuring chamber and having a smooth cylindrical portion of a diameter greater than the measuring chamber and less than said measuring element projecting into said measuring chamber intermediate the ends thereof to vary the capacity thereof, said member having another portion screw threaded into said recess and projecting from one end of the measuring element, and a thumb piece on said projecting end for rotating said member.

STEPHEN J. KRIVIG.